United States Patent
Joseph et al.

(10) Patent No.: US 8,877,278 B2
(45) Date of Patent: Nov. 4, 2014

(54) FABRICATED FOOD PRODUCT MADE FROM FRESH POTATO MASH

(71) Applicant: Frito-Lay North America, Inc., Plano, TX (US)

(72) Inventors: Ponnattu Kurian Joseph, Irving, TX (US); Renu Mathew, Dallas, TX (US); Sheyla Rivera Ramsay, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 14/086,309

(22) Filed: Nov. 21, 2013

(65) Prior Publication Data

US 2014/0079861 A1 Mar. 20, 2014

Related U.S. Application Data

(60) Division of application No. 13/452,396, filed on Apr. 20, 2012, now Pat. No. 8,632,835, which is a continuation of application No. 11/062,193, filed on Feb. 18, 2005, now abandoned.

(51) Int. Cl.
*A47J 39/00* (2006.01)
*A23L 1/216* (2006.01)

(52) U.S. Cl.
CPC ............ *A23L 1/2161* (2013.01); *A23L 1/2715* (2013.01)
USPC ............................ 426/520; 426/518; 426/519

(58) Field of Classification Search
USPC .................................................. 426/637, 520
See application file for complete search history.

(56) References Cited

U.S. PATENT DOCUMENTS 4,269,861 A * 5/1981 Caridis et al. ................. 426/438

* cited by examiner

*Primary Examiner* — Patricia George
(74) *Attorney, Agent, or Firm* — James R. Gourley; Colin P. Cahoon; Carstens & Cahoon, LLP

(57) ABSTRACT

A composition and method for providing a strong dough having a substantial quantity of fresh potatoes. Fresh potatoes are made into a mash and centrifuged to reduce the water content to about 70% by weight. Such potato mash can comprise over 50% by weight of the final dough. This dough can be used to make sheeted or extruded products. Such dough results in improved, more naturally-flavored products compared to products made entirely from dehydrated or partially-dehydrated potato derivatives. The method comprises finely slicing potatoes to form a potato slurry or mash; decanting excess water from the potato slurry; heating the potato slurry to a temperature no greater than about 190 degrees Fahrenheit; cooling the slurry to under 140 degrees Fahrenheit; and imparting a low amount of work input to a mixture of the slurry and other ingredients to form a shapeable dough.

2 Claims, 3 Drawing Sheets

FABRICATED FOOD PRODUCT MADE FROM FRESH POTATO MASH

CROSS REFERENCE RELATED APPLICATION

This application is a divisional of U.S. patent application Ser. No. 13/452,396, filed Apr. 20, 2012, entitled "Fabricated Food Product Made From Fresh Potato Mash", now U.S. Pat. No. 8,632,835, which is a continuation of abandoned U.S. patent application Ser. No. 11/062,193, filed Feb. 18, 2005, entitled "Fabricated Food Product Made From Fresh Potato Mash," the technical disclosures of which are hereby incorporated by reference in their entirety.

BACKGROUND

1. Technical Field

The present invention relates to a fabricated food product made in significant part from fresh potato mash. More specifically, this invention relates to making dough that has improved strength and produces dehydrated and/or fried product with a light texture having improved, more natural flavor. Particular formulations are well-suited for creating fabricated, extruded snack products.

2. Description of Related Art

In the food industry, potato-based products are normally made from dough mixes incorporating potato derivatives such as potato flakes, potato flour, potato granules, and/or potato starch. Potato-based products made in such fashion can deliver numerous shapes and attributes, but unfortunately most of the potato flavor is lost in the process of producing the ingredients. In general, potato dough made from potato derivative products tends to be weak and does not maintain adequate strength for sheeting or extruding when formed into shapes. Although prior art methods have shown that sheetable potato doughs could be made from raw potato stock, those potatoes underwent several dehydration stages to reduce the moisture content of the raw potatoes.

For example, U.S. Pat. No. 6,251,465 granted to Bello et al. discloses methods for making improved potato products by using raw potato stock as a starting material to form a sheetable dough. This patent discloses methods to produce a potato gel suitable for sheeting or extruding. This patent discloses a controlled dehydration method at about 195 degrees C. until the moisture content of potato pieces reaches 40% to 60%. Although Bello teaches that sheetable potato dough can be made, at least in part, from raw potato stock, the Bello method requires several separate dehydration and cooling stages, each causing more and more loss of natural flavor. Several other notable points from Bello are as follows: the Bello potato gel is partially gelatinized and not fully gelatinized before it is mixed with dry ingredients, as seen in the dramatic increases in viscosity as temperature is increased in Bello FIGS. 2 through 4; Bello's high-shear grinding is more likely to damage potato starch molecules; moisture is lost during baking as practiced in Bello; product is chilled between 30° C. (86° F.) and 50° C. (122° F.); some flavor volatiles are lost during dehydration; Bello requires partial dehydration of chip stock potato to no greater than about 60% moisture content for use in its process; and Bello teaches that a suitable dough formulation contains potato granules, wheat starch, and corn syrup solids. Thus, a need exists for an improved, gentler method for removing moisture from fresh potatoes and for processing at much lower, controlled cooking temperatures to create fabricated potato products from fresh potatoes.

Past attempts to make potato dough and snacks from fresh potato mash have failed due to high moisture content of the fresh mash. Fresh potatoes are infrequently used for such dough, especially in the case of extruded snack pieces. Several patents disclose improvements to potato-based dough and/or mash including dough and/or mash composition, mixing, and preparation of potatoes as ingredients.

U.S. Pat. No. 4,169,166 issued on Sep. 25, 1979 to Kiett et al, discloses an extruding process to remove the skins, eyes and defects of potatoes. Potato pulp is extruded as cooked potato pieces are conveyed by a compression-type screw conveyor along the length of a perforated conduit. Less cellular damage occurs to the potato pulp as compared to some prior art methods. The pulp has a stronger than the usual flavor of mashed potatoes. However, the extruding process generally is coarse and there are other, less damaging methods of reducing potato pulp to small pieces.

U.S. Pat. No. 6,808,734 issued on Oct. 26, 2004 to Villagran, discloses a dough composition of potato flour between 35% and 85% by weight where the dough has a soluble Amylose to soluble Amylopectin ratio of from about 0.4 to about 4. Such amounts of Amylose and Amylopectin account for an improved crispness to a finished chip product. However, there is no discussion of the use of fresh potatoes in the dough formulation.

Relatively little in the prior art discloses the use of a relatively large quantity of fresh potatoes to form a potato dough suitable for forming snack pieces or sheeting. This was so because fresh potato mash prepared by prior art methods had very high moisture content, typically from about 75% to about 85%. In the prior art, use of relatively large quantities of fresh potatoes introduced problems with texture and stripping of flavor from the fresh potatoes in the dehydration process.

Potato dough requires less than about 50% moisture for potato pre-forms to retain their shape during processing and dehydration to a finished snack of a light texture. This limits the amount of fresh potato mash that can be used in a dough system. Further, potato mash is traditionally cooked at near the boiling point of water (212 degrees F.). However, such cooking removes or denatures desirable flavor chemical components.

U.S. Pat. No. 3,634,105, granted on Jan. 11, 1972 to Beck, describes "a process for producing large potato pieces which can be rehydrated and prepared as pan fried potatoes or hash brown potatoes . . . . " Beck teaches that raw potatoes can be first cooked and then comminuted to form a potato slurry or mash. The Beck patent teaches that when "the heat treatment step to gelatinize the raw starch is accomplished before the dough is extruded," the "heat-treated dough mix must be kept hot until extrusion is completed. The reference further teaches that "effective starch gel formation in the dough requires a minimum heat treatment temperature of about 190 [deg] F. In tests where dough was heated to only 170 [deg] F., no beneficial result was found." Beck also states that "if the dough cools before the finish of mixing or before extrusion, the gel structure is disrupted and the advantages of our process are decreased." As previously noted, however, such cooking at relatively high temperatures removes or denatures desirable flavor chemical components. It is therefore desirable to have a method of forming and cooking potato dough at lower temperatures so that more of the desirable flavor components are retained.

Similarly, U.S. Pat. No. 4,109,012, granted to Bates on Aug. 22, 1978, teaches that relatively high-temperature cooking is necessary to cook fresh potato in a process for making coherent, workable potato dough. For example, Bates teaches that "whole potatoes are then cooked by baking until they are completely cooked . . . . Also, for the purposes of this invention, 'complete' cooking is hereby defined as that stage in cooking when the internal temperature of the center of the potato has reached a temperature of at least about 190 [deg] F."

U.S. Pat. No. 4,005,139, granted to Kortschot on Jan. 25, 1977, is yet another reference that discloses a method of forming potato dough from a slurry or mash of potatoes. Kortschot, however, teaches that dehydrated potato solids and water can be rapidly and severely mixed and agitated to form a potato slurry, which can then be fed to an extruder to produce a product capable of being fried.

Thus, a need exists for a formulation and method for producing a potato dough or masa wherein fresh potatoes are maximized by weight of the ingredients. A need exists to provide ingredients that maintain natural potato flavors while retaining a light texture as a snack. A need exists to gently handle and process raw potatoes to provide for desired characteristics in finished products, particularly those that are extruded and fried. A need exists to remove water from fresh potato pulp so that a higher relative amount of fresh potato can be added to a dough formulation. A need exists to keep processing temperatures as low as possible to minimize the degradation and loss of flavor constituents. A need exists for a method of producing shaped collets that resist deformation in subsequent dehydration and/or frying processes while retaining a light texture in the finished product.

SUMMARY OF THE INVENTION

A composition and method are disclosed which provide an improved fresh potato mash which can comprise a substantially higher relative quantity in a dough formulation than previously possible. Past attempts to make such a potato dough have failed due to high moisture content of fresh potato mash. The inventors, however, have discovered that cohesive and strong dough can be made from fresh, mashed potatoes, which initially have a moisture content of about 70% to about 85% by weight. Excess water is removed and the cut potatoes are added to other dough ingredients after minimal thermal treatment. With gentle dehydration, the fresh, cut potatoes can comprise up to roughly 5-95% by weight of the final dough formulation, which can also include potato starch, potato flakes, and other minor ingredients. This dough formulation can be used to make products in multiple forms including sheeted or extruded products.

Such dough also gives the final product an improved, more natural flavor and lighter texture when compared to prior art products made entirely from dehydrated or partially-dehydrated potato derivatives due to a novel method of preparation. The method comprises chemically treating peeled potatoes; slicing the potatoes into potato particles, thereby forming a fresh potato mash; decanting excess water from the potato mash such that the moisture content of said potato mash is reduced to less than about 70% by weight in a preferred embodiment; cooking the potato mash below a temperature up to about 190 degrees Fahrenheit; and, cooling the potato mash to a temperature under about 140 degrees Fahrenheit. Then the potato mash is mixed with a dry mix of potato solids and other minor ingredients. After mixing, the mixture is then stuffed into a dough pump which feeds the dough into a low-shear die (or dies), thereby forming a potato extrudate having a minimal amount of work input.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

Figure 1:
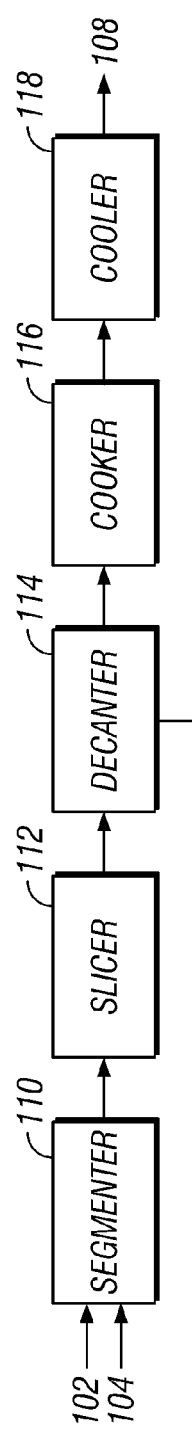
FIG. 1 is a schematic view of a novel method to prepare fresh potatoes for forming a potato-based dough according to the present invention.

REFERENCE NUMERALS 102 raw or fresh potatoes
104 treatment solution
106 water
108 fresh potato mash
110 segmenter
112 slicer
114 decanter
116 cooker
118 cooler
202 dry ingredients
204 emulsifier
206 water
210 dough mixture
218 dry mixer
220 wet mixer
221 dough pump
222 die & cutter
224 feed conveyor
226 fryer
228 exit conveyor
232 screen
302 inlet
304 solids exit
306 fluid exit
308 central chamber
310 auger
320 rotating shaft
402 viscosity RVU
404 time in minutes
406 temperature in degrees C.
408 RVA profile of fresh potato mash
410 temperature profile

DETAILED DESCRIPTION

While the invention is described below with respect to a preferred embodiment, other embodiments are possible. The concepts disclosed herein apply equally to other compositions of, and methods for forming, a dough made from fresh potatoes. Throughout the description, potatoes are referenced as an ingredient for a dough formulation, although any type of comestible source may be substituted for potatoes such as, but not limited to, sweet potatoes, tubers, vegetables, and fruits. The invention provides a composition and method for forming a dough wherein one or more fresh fruits or vegetables may comprise a substantial fraction of the dough ingredients.

Ideally, such a fraction is between 5% and 95% by weight depending on the amount of water remaining in the prepared fresh dough ingredient and desired finished snack characteristics, such as texture, flavor, appearance, and shelf-life.

Method

According to the prior art, a potato mash is formed by heating potato pieces at greater than about 190 degrees F. (88 deg. C.) and subsequently forming a potato mash. Such heating is considered cooking as opposed to merely heating of potatoes. Such processing creates a cooked potato mash. Such cooked mash is then added to other ingredients to form a prior art dough for further processing.

However, according to the present invention, fresh potatoes are processed at relatively lower temperatures before being added as a freshly-processed potato slurry to other dough ingredients as necessary to form a dough. The use of fresh potatoes offers many improvements over traditional formulations including, but not limited to, improved natural potato flavors. One reason for flavor differences between food products prepared from fresh potatoes and food products prepared from dehydrated potato products appears to be the degrading effect of the heating and dehydration processes on the potato cells within the potato pulp. Although the precise nature of this degradation is not known, it is theorized that a number of flavor precursors are either destroyed or significantly reduced during processing. Such degradation leads to food products having less than desired potato flavor intensity.

In one embodiment, and with reference to FIG. 1, a fresh potato mash is prepared from raw, skinned potatoes 102. Raw, skinned potatoes 102 at room temperature are conveyed into a potato segmenter 110 wherein the potatoes are cut into pieces. However, any solid produce segmenter may be used. In the potato segmenter 110, a treatment solution 104 is added to the potato pieces. A treatment solution 104 helps control oxidation and discoloration. Oxidation is evidenced by a brown or gray color. In one embodiment, a treatment solution 104 is comprised of up to 5% citric acid, and/or up to 2% sodium acid pyrophosphate, and/or up to 1% bisulfite. In addition, potato pieces may be chilled to as low as 35 degrees Fahrenheit.

From the segmenter 110, the potato pieces are sliced into small pieces in a micro slicer 112. Such slicer is traditionally used for cutting meats. Such cutting is a relatively gentle method of reducing the size of potato particles. In one embodiment, the gap between the blades is about 30-thousandths of an inch thick, and thus the potato particles have a nominal thickness of about 30-thousandths of an inch. The potato particles preferably have thicknesses on the order of several thousandths of and inch to several hundredths of an inch. Other slicers are acceptable as long as they are able to reduce potatoes to potato pieces of a desired thickness, which is typically about five-thousandths of an inch (0.005") to about half an inch (0.5").

A micro slicer is preferred over a masher or extruder because less cellular and intra-cellular damage results to the potato pulp. Potato starch granules, typically from 20 to 100 microns in size, are much smaller than potato pulp cells. The slurry of potato pieces exits the slicer with a temperature of about 45 to about 145 degrees F. In one embodiment, the slurry of potato pieces exits the slicer 112 under 50 degrees F. (10 deg. C.), and has a slushy texture, but the slurry may enter or exit the slicer at other temperatures.

With reference to FIG. 1, potatoes pieces in slurry form are subsequently passed from a slicer 112 into a device for removing excess water. Such a device may be, but is not limited to, a decanter, a drum dryer, a vacuum drum dryer, or a heated concentrator. Such device should limit thermal degradation of the potato pieces. In one embodiment, such a device is a decanter 114 wherein water 106 is drawn off of the potato pieces. In a preferred embodiment, the potato slurry or mash exits the decanter 114 with a moisture content nominally about 70% by weight.

Figure 3:
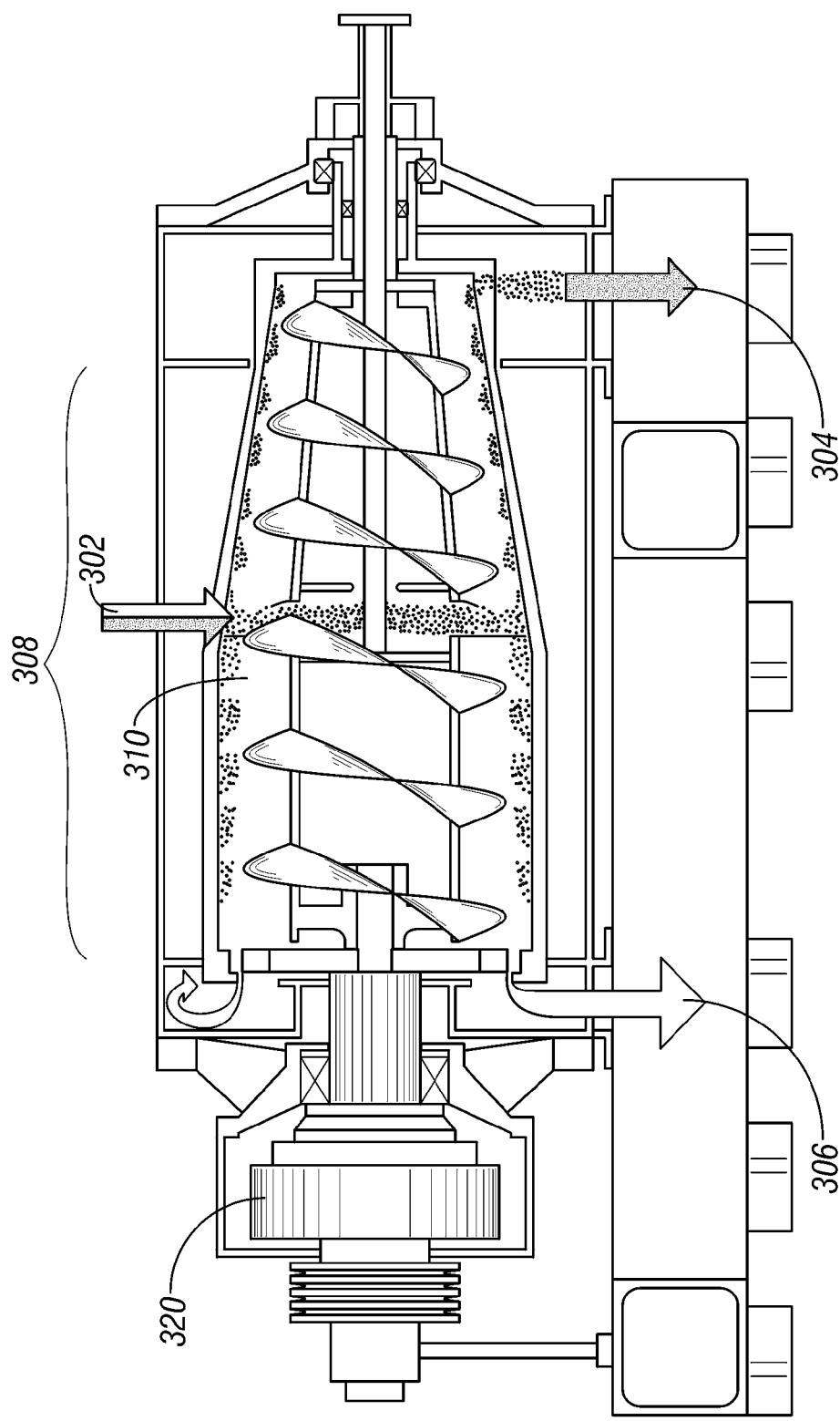
FIG. 3 is a side view of a decanter for removing excess water from cut fresh potato pieces.

FIG. 3 shows one embodiment of a decanter 114 used in the present invention. With reference to FIG. 3, a centrifuging decanter provides an inlet 302 for a potato slurry wherein the slurry flows into a central chamber 308. Within the central chamber 308, solid potato pieces are driven to a potato solids exit 304, by a rotating shaft 320 having an auger 310. Such decanter 114 and auger 310 provide one means of non-thermally removing excess water from potato pieces while minimizing cellular damage to the pieces. Such centrifuge is a combination of gentle centrifugation and a settling tank.

Note, however, that devices other than a decanter can be used to gently remove moisture from the slurry while maintaining cellular damage to a minimum. For example, freeze-drying subjects potato to very low level of thermal or other transformations. At the same time, it is capable of removing moisture to very low levels similar to those traditionally available in dry potato flakes and granules. In other embodiments, the potato slurry can be vacuum-dried by reducing the ambient pressure until the moisture in the potato slurry vaporizes at the desired temperature. Other possible forms of moisture removal include but are not limited to: atmospheric drum drying, vacuum drum drying, and other forms of traditional moisture removal. The manner of moisture removal chosen depends on the desired level of thermal and structural transformation of the potato cells.

Returning to FIG. 3, excess aqueous solution is removed through a fluid exit 306. Up to about 5% of incoming solids may be lost through the fluid exit 306. In one embodiment, the moisture content of the incoming slurry is measured and is used as a feed forward control to adjust shaft speed to obtain a desired exiting moisture content at the potato solids exit 304. In an alternative embodiment, the moisture content of the exiting potato solids at the solids exit 304 is measured and used as a feedback controller. Dough and dough pieces more fully retain their shape as compared to prior art compositions containing the same relative amount of potato pulp prepared by prior art methods.

With reference to FIG. 1, cut and decanted potato pieces subsequently are heated in a cooker 116 for several minutes to reduce undesired enzymatic activity in the potato pieces and to gelatinize the same. The temperature of the cooker 116 may be done between 140 and 190 degrees F. At 145 degrees F. (63 deg. C.), most undesirable enzymatic reactions are eliminated after 22 minutes with little gelatinizing of the potato mash. At 180 degrees F. (82 deg. C.), within a short time, most of the potato mash is gelatinized. The cooking is done at a relatively low temperature to maximize flavor retention and still reduce undesired enzymatic activity. At 135 degrees F. (57 deg. C.), peroxidase enzyme activity is reduced to 50%, and lipoxygenase enzyme activity is reduced to 40%. At 145 degrees F. (63 deg. C.), peroxidase enzyme activity is reduced to 30%, and lipoxygenase enzyme activity is reduced to 15%. At 155 degrees F. (68 deg. C.), peroxidase enzyme activity is reduced to 15%, and lipoxygenase enzyme activity is absent. In one embodiment, the cooker is a surface heat exchanger, and more specifically a closed swept surface heat exchanger. Note, however, that other types of cookers can be used to reduce enzymatic activity while maximizing flavor retention.

After leaving the cooker 116, cooked potato mash enters a cooler 118. In one embodiment, a cooler 118 is a scraped surface (or "swept surface") heat exchanger. A scraped-surface heat exchanger has a tubular chamber through which the product to be heated passes through by the aid of a pump. The scraped-surface heat exchanger has a heating medium outside the adjoining heat transfer walls containing the slurry being heated. A motorized scraper keeps the walls from fouling, and such scraper helps agitate the slurry for superior heat transfer and substantially faster heating. The small size of the potato particulates also helps reduce cook time compared to prior art thick slabs of potato. The cooling time in such a cooler will depend on the mash composition, the entering and exiting temperatures, and the desired amount and manner of starch retrogradation. For example, cooked potato mash enters the cooler at approximately 140-190 degrees F. and exits the cooler at approximately 40-140 degrees F. In one particular embodiment, the cooked potato mash is cooled from about 140-190 degrees F. to about 70-100 degrees F. in roughly 20 to 30 minutes until the temperature of the mash falls to about 65 degrees F. Then the mash is held at 65 degrees F. for about 20 to 30 minutes. This helps to achieve a certain amount of retrogradation in a compact, enclosed pipe. In fact, if desired, some heating and/or cooling can be achieved by holding product within insulated pipes. This is an improvement over conventional atmospheric cooling systems of the prior art, where freshly-cooked potato slabs were not held at a particular temperature and were not contained in an enclosed system, which atmospheric systems are more difficult to control. Other residence times are possible. Such exchanger provides superior cooling of delicate particulate matter such as a mash or slurry of potato pieces. Such an exchanger can handle small particles and particles of a relatively large size up to about 1 inch (2.54 cm) in diameter.

Cooled fresh potato mash 108 emerges from the cooler and is ready to be added to other ingredients to form a dough. In one embodiment, fresh potato mash 108 may be held for up to about 5 hours before being added to other dough ingredients. Such delay provides beneficial characteristics to a potato dough and subsequently to finished products. Such delay allows retrogradation of the starches in the potato mash. Such cooled fresh potato mash 108 is a flowable gel and provides better shape retention to dough and dough pieces as compared to dough formulations using conventional dehydrated ingredients. If desired, however, in yet another embodiment, cooked potato mash passes straight from the cooker 116 to the dry mixer 218 and the continuous mixer/stuffer 220, thereby simplifying the process and avoiding costs associated with operating and maintaining a cooling stage. Also, in other embodiments the cooking (and cooling, if desired) can be performed in multiple stages.

Figure 2:
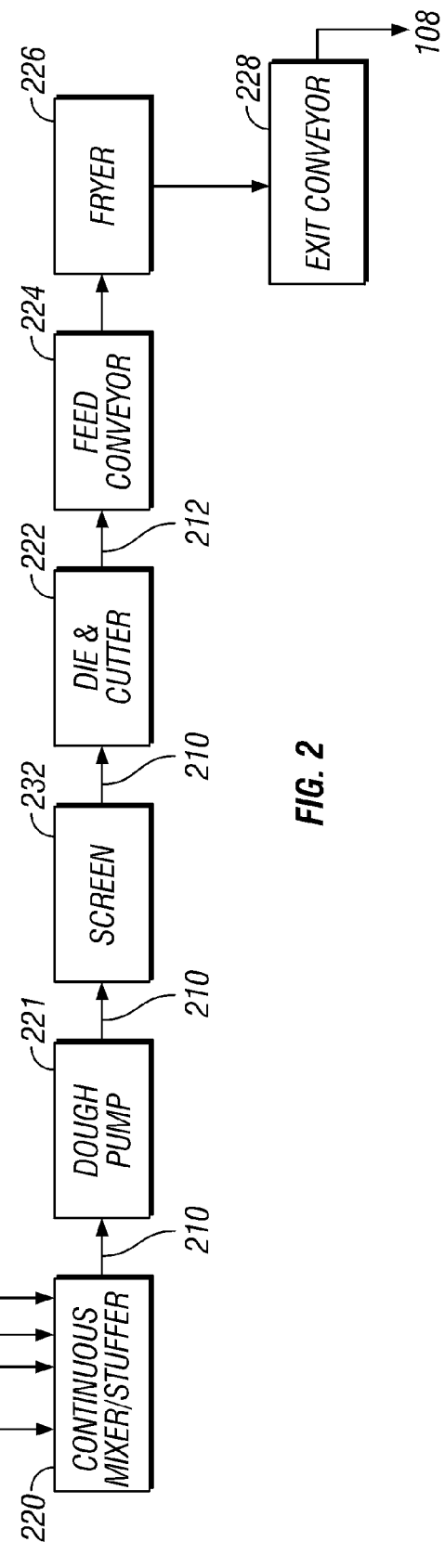
FIG. 2 is a schematic view of cold forming and subsequent frying of potato dough forms according to the present invention.

One embodiment of the mixing process for mixing dough ingredients is shown schematically in FIG. 2. With reference to FIG. 2, dry ingredients 202 are first fed into a dry mixer 218 before passing into a continuous mixer/stuffer 220, although these two mixers can be combined. In one embodiment, the dry mixer 218 is a continuous mixer, although in other embodiments the dry mixer 218 can be a batch mixer. Dry ingredients may be comprised of potato starch, potato flakes, emulsifier(s), and/or sugars. As in the prior art, potato flakes are used to reduce the overall moisture content of the final dough mixture. However, unlike the prior art, the relative amount of fresh potato mash can be included in a dough to a much higher percent by weight due to the lower moisture content of the fresh mash. One or more emulsifiers 204 and water 206 are next added to the dry ingredients in the dry-ingredient mixer 218 or the wet mixer 220. For example, 0.4-0.6% monoglyceride and diglyceride can be added. Finally, potato mash 108 is fed into the continuous mixer/stuffer 220 and combined with the other ingredients to form a dough. Note that emulsifier alternatively can be added before the dry mixer, if desired. It can, for example, be added before mash cooking, after mash cooking, or even after mash cooling.

The operating conditions of the mixer are selected so as to maximize mixing and minimize the work input into the dough. The dough ingredients are mixed at relatively low temperatures, from about 50-145 degrees F., and more preferably at about room temperature (70 degrees F., 21 deg. C.) because the viscosity of the dough is able to increase as starch structures stiffen the dough. Further, mixing at low temperatures reduces the amount of bacterial growth between cleanings of process equipment. Potato dough leaving a wet mixer 220 is about 50-140 degrees F. The overall moisture content of the dough is preferably about 46 to 47 percent by weight. However, other values of overall moisture content are possible.

In one embodiment, the mixed dough 210 exiting a continuous mixer/stuffer 220 is subsequently sent to a dough pump 221, which in turn transfers the mixed dough 210 through a screen 232 to remove any large particles too big for the die orifice(s) 222. Next, the mixed dough 210 is sent through a die and cutter 222 where uncooked snack pieces are shaped or formed by extrusion at relatively low temperatures and at low shear rates. The low shear rate is required to minimize changes to the product. More specifically, it imparts a low amount of work input or energy per unit mass. Such processing is referred to herein as "cold forming." In such low temperature extrusion, there is less damage to potato starches. In one embodiment, the dough pieces leaving a dough pump (or "die press") 222, but before entering an extruder and cutter 222, according to the present invention are about 85 degrees F. (29 deg. C.).

In a preferred embodiment, the mixed dough may be under a pressure up to about 200 psi or less exiting the mixer/stuffer 220. Such pressure is needed to properly feed the dough into the dough pump 222. During extrusion, the dough mixture may be under pressure up to about 1,000 psi (6,890 MPa). The objective is to minimize the work input on the dough while achieving desired mixing and pressure for forming. Extrusion should occur below 150 degrees F. Preferentially, extrusion should not cause the temperature of the dough to rise above 100 degrees F. (38 deg. C.). Too high a temperature rise during extrusion is a sign of too much work input to the dough. Whereas common prior-art processes for forming extruded snack pieces impart roughly over 100 watt-hr/kg of energy into dough, the dough mixing and forming process of the present invention imparts roughly 2 watt-hr/kg to about 40 watt-hr/kg, and about 8 watt-hr/kg in a preferred embodiment. In one embodiment, the temperature of potato extrudate exiting an extruder is 85 degrees F. (30 deg. C.). Potato extrudate having greater than 50% moisture content by weight generally cannot hold its form during subsequent processing and cooking. As an alternative to extrusion, a dough mixture 210 may be formed into a sheet from which snack pieces may be cut and further processed. Such pieces can be fried or baked during subsequent processing. Potato extrudate can also be cut into pieces for further processing into snack pieces, if desired.

In one embodiment, snack pieces pass onto a conveyor 224 and into a fryer 226 where pieces cook for about one and a half minutes in fryer oil. In other embodiments, a fryer 226 may be replaced by any other type of cooker or dehydrator. In a further embodiment, a fryer 226 has an oxygen-reduced or oxygen-controlled atmosphere. In such an embodiment, nitrogen is introduced in the void space above the oil. In another embodiment, steam is introduced in the void space above the oil. In yet another embodiment, both nitrogen and steam are introduced into the void space above the oil. Such control prolongs the life of the oil and improves the qualities of the end product. In one embodiment, fresh oil is added to replenish oil carried away by product and to help keep product fresh. Once the pieces are finished in the fryer 226, the pieces exit the process on an exit conveyor 228.

Figure 4:
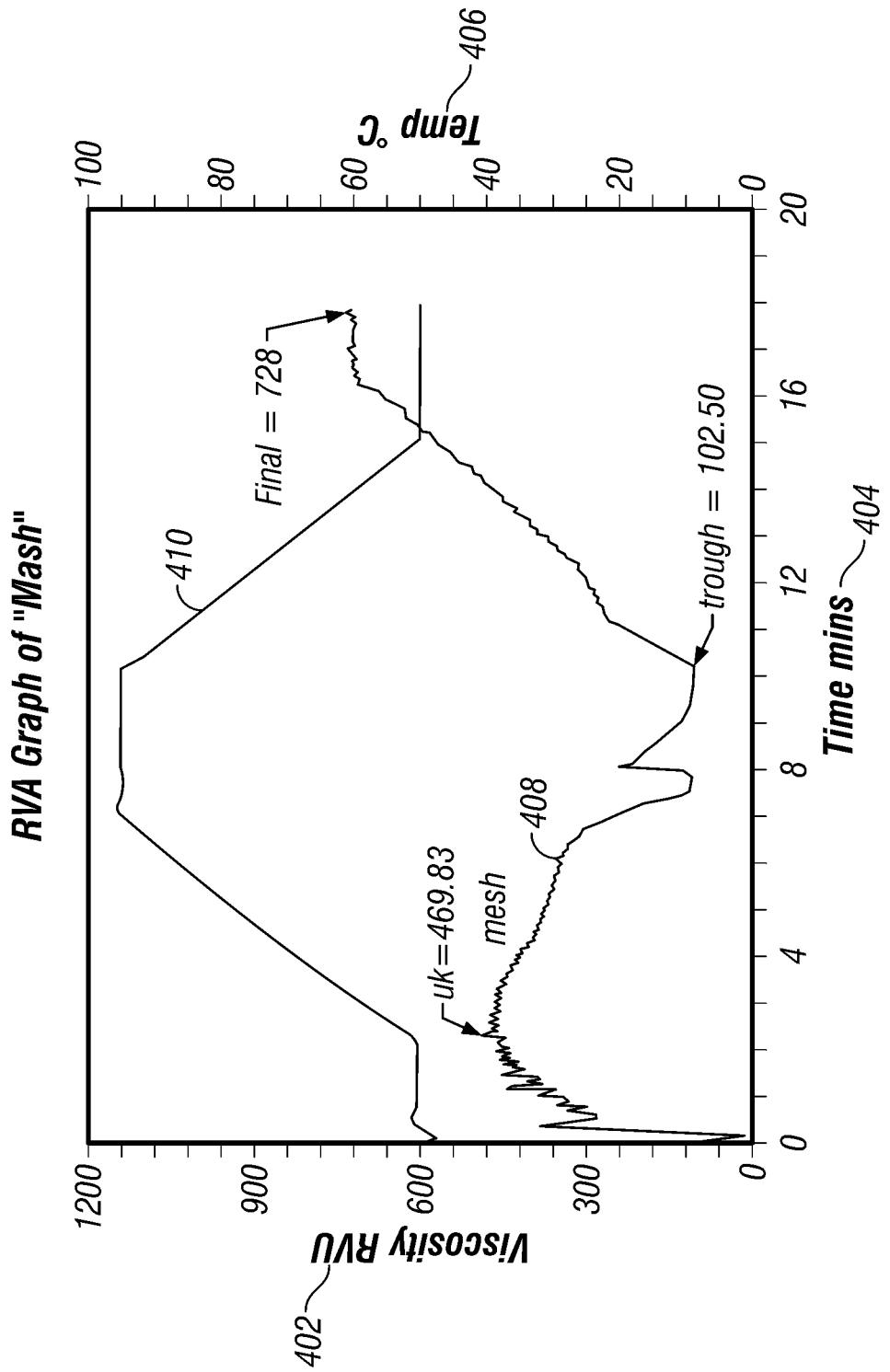
FIG. 4 is a graph of an RVA profile for the fresh potato mash of a preferred embodiment, wherein viscosity is shown on the left vertical axis, time is shown on the horizontal axis, and temperature is shown on the right vertical axis.

The mash preparation and cold-forming methods of present invention are different from and have several benefits over prior art processes for making formed food products in several ways. As seen in FIG. 4, the relatively stable viscosity of the fresh potato mash over time and after temperature increase shows that the potato mash is completely gelatinized before it is mixed with dry ingredients. Also, the low-shear mixing and cooking can also help minimize starch damage. The enclosed nature of the cooking and cooling stages in a preferred embodiment ensures no moisture loss and no loss of flavor volatiles.

Note that the above-described process can also be applied to other vegetables, and particularly to other tubers and starchy-vegetables. Such starchy-vegetables can include but are not limited to: potatoes, corn, dry beans, green peas, lentils, winter squash, yams, and sweet potatoes. For example, a general method for preparing an improved, fresh, starchy-vegetable mash comprises the following steps:

a) providing an uncooked, whole starchy-vegetable;

b) segmenting said uncooked, whole starchy-vegetable into a plurality of pieces;

c) slicing said pieces into a plurality of particles, thereby forming a starchy-vegetable slurry;

d) gently reducing the moisture content of said starchy-vegetable slurry, wherein the temperature of said starchy-vegetable slurry does not exceed about 190 degrees Fahrenheit;

e) cooking said starchy-vegetable slurry at a temperature no greater than about 190 degrees Fahrenheit;

f) cooling said starchy-vegetable slurry to a temperature no less than about 40 degrees Fahrenheit and no greater than about 140 degrees Fahrenheit, thereby forming a fresh starchy-vegetable mash.

Formulation

Table 1 shows the relative amounts of dough ingredients according to one embodiment of the invention. The ingredients are mixed according to the method described previously. The present invention enables potato mash moisture concentrations from as low as roughly 10% (using vacuum drying) to as high as 85%, depending on potato solids and decanter settings. However, in a preferred embodiment, the cooked potato mash is virtually completely gelatinized and has a moisture content greater than about 60% by weight. The cooked potato mash is most preferably targeted to about 70% by weight. The relative amount of potato mash compared to the other ingredients is preferably at least 40 percent by weight, and even more preferably greater than 50 percent by weight.

Extra water is added to the dry minor ingredients during dough mixing to adjust the moisture content to 40-55%, more preferably 46%, once the potato mash is added. All dry ingredients, water and emulsifier are mixed in a batch mixer at high speed. The mixture is subsequently fed to an extruder. The mixing process comprises mixing the dry ingredients for 10 seconds, adding the water and emulsifier over 15 seconds, and finally mixing for 15 seconds to completion.

TABLE 1

Potato Dough Formulation

| Ingredient | Wet-basis % (no extra water) |
|---|---|
| Cooked Mash | 53.3 |
| Potato Starch | 28.1 |
| Potato Flakes | 15.5 |
| Sugar | 1.55 |
| Emulsifier | 1.55 |
| Water | 0.00 |
| TOTAL | 100 |

Table 2 presents an alternative dough formulation where the amount of potato starch is 24.7%, and potato flakes are 19.6%.

TABLE 2

Alternative Potato Dough Formulation

| Ingredient | Wet-basis % (no extra water) |
|---|---|
| Cooked Mash | 52.6 |
| Potato Starch | 24.7 |
| Potato Flakes | 19.6 |
| Sugar | 1.55 |
| Emulsifier | 1.55 |
| Water | 0.00 |
| TOTAL | 100 |

Table 3 presents a formulation wherein potato dextrin is included on the order of one percent, and added water is included on the order of a few percent in order to obtain a pre-determined moisture content of 46%. A dough formulation in a preferred embodiment contains potato dextrin in the same or a similar concentration, as well as added water, if necessary, to obtain the desired overall dough moisture content. Also, a dough formulation in a preferred embodiment has insignificant amounts or no detectable amounts (less than 0.5%, for example) of the following substances: potato granules; non-potato starches, such as wheat starch; and corn syrup solids.

TABLE 3

Alternative Potato Dough Formulation

| Ingredient | Wet-basis % (no extra water) |
|---|---|
| Cooked Mash | 51.5 |
| Potato Starch | 24.9 |
| Potato Flakes | 15.6 |
| Potato Dextrin | 0.9 |
| Sugar | 1.5 |
| Emulsifier | 1.5 |
| Water | 4.2 |
| TOTAL | 100 |

The emulsifier is composed of mono- and diglycerides of fat forming fatty acids prepared from partially hydrogenated soybean oil with not more than 0.02% TBHQ and 0.01 citric acid added as a preservative. The emulsifier in a preferred embodiment is formed at 80 deg. F., has a bland odor, and is an ivory white plastic solid at room temperature. The emulsifier has a melting point between 118 and 122 deg. F. The emulsifier also has a minimum content of 42% alpha monoglyceride, a maximum of 1.0% free glycerine, a maximum of 0.5% moisture, and a maximum of 1.0% free fatty acid (such as oleic acid). Its stability is rated at 50 hours A.O.M. Such an emulsifier in a preferred embodiment provides benefits such as improved texture, good mouth feel, blisters on finished snack pieces, and helps tie up free starch. Other emulsifiers may be used in place of the one described above. In one embodiment of the invention, dehydrated potato flakes are added, along with the other dough ingredients, to the cooked potato mash to form a dough. Once the dough is formed, it may be further processed to form snack pieces having improved potato flavor.

The following are several notable characteristics of the dough formulation of the present invention: the use of potato dextrins; the ability to form acceptable product without using potato granules, corn syrup solids, or non-potato starches; and the use of a fresh potato slurry or mash having a moisture content greater than about 60%, and further where the fresh potato slurry or mash is useable even with high moisture content such as 70% by weight, in one example.

While the invention has been particularly shown and described with reference to a preferred embodiment, it will be understood by those skilled in the art that various changes in form and detail may be made therein without departing from the spirit and scope of the invention.

We claim:

1. A method for preparing a fresh starchy-vegetable mash comprises the following steps:
    a) providing an uncooked, whole starchy-vegetable;
    b) segmenting said uncooked, whole starchy-vegetable into a plurality of pieces;
    c) slicing said pieces into a plurality of particles, thereby forming a starchy-vegetable slurry under about 50 degrees Fahrenheit;
    d) gently reducing the moisture content of said starchy-vegetable slurry, wherein the temperature of said starchy-vegetable slurry does not exceed about 190 degrees Fahrenheit and wherein cellular damage to said particles is minimized;
    e) cooking said starchy-vegetable slurry at a temperature no greater than about 190 degrees Fahrenheit;
    wherein the starchy-vegetable slurry of step b) is maintained after said slicing, at a temperature of about 50 degrees Fahrenheit.

2. The method of claim 1, wherein said uncooked, whole starchy-vegetable of step a) comprises at least one of the following: corn, dry beans, green peas, lentils, and winter squash.

* * * * *